J. W. KITTREDGE.
AUTOMATIC POWER TRANSMISSION.
APPLICATION FILED OCT. 28, 1916.

1,311,236.

Patented July 29, 1919.

WITNESSES:

INVENTOR.

UNITED STATES PATENT OFFICE.

JOHN W. KITTREDGE, OF AKRON, OHIO.

AUTOMATIC POWER TRANSMISSION.

1,311,236.　　　　Specification of Letters Patent.　　Patented July 29, 1919.

Application filed October 28, 1916. Serial No. 128,244.

*To all whom it may concern:*

Be it known that I, JOHN W. KITTREDGE, a citizen of the United States, residing at Akron, in the county of Summit and State of Ohio, have invented a new and useful Automatic Power Transmission, of which the following is a full, clear, and exact description.

My invention relates to gear or sprocket power transmissions automatically operated for changing speed.

The objects of my improvements are:—

1st. To provide a power transmission in which the driving and driven members are connected by gears and other positive interlocking parts, securing positive action and absolute safety.

2nd. To provide a transmission in which different loads or torques upon the driven member automatically put different trains of mechanism into operation, giving different speeds of the driven member from a uniform speed of the driving member, the greater torque on the driven member producing in it a less speed, and the less torque on the said driven member producing in it a greater speed.

I attain these objects by the mechanism herein described which I have shown as applied to a chain block or chain hoist, although it is applicable to many other classes of machinery. The brake and chain guide essential to a chain hoist are omitted from the drawings as not pertinent to this invention.

Figure 2:
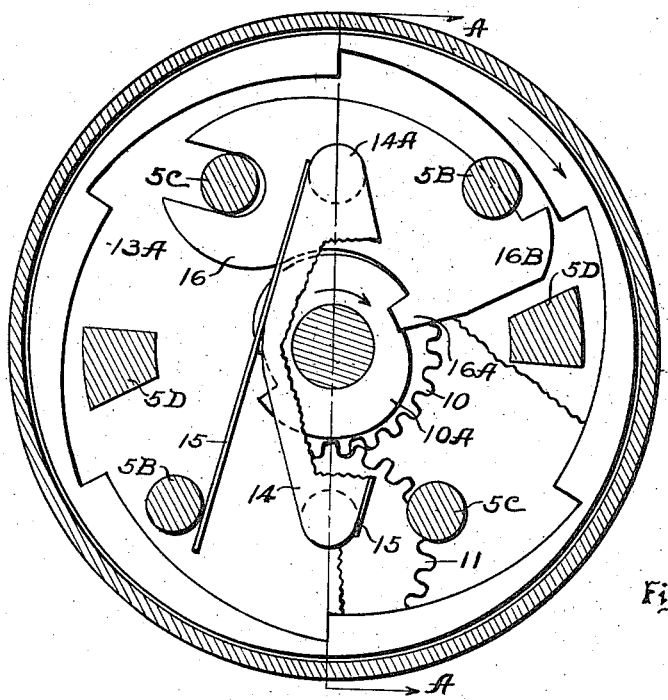
Figure 1:
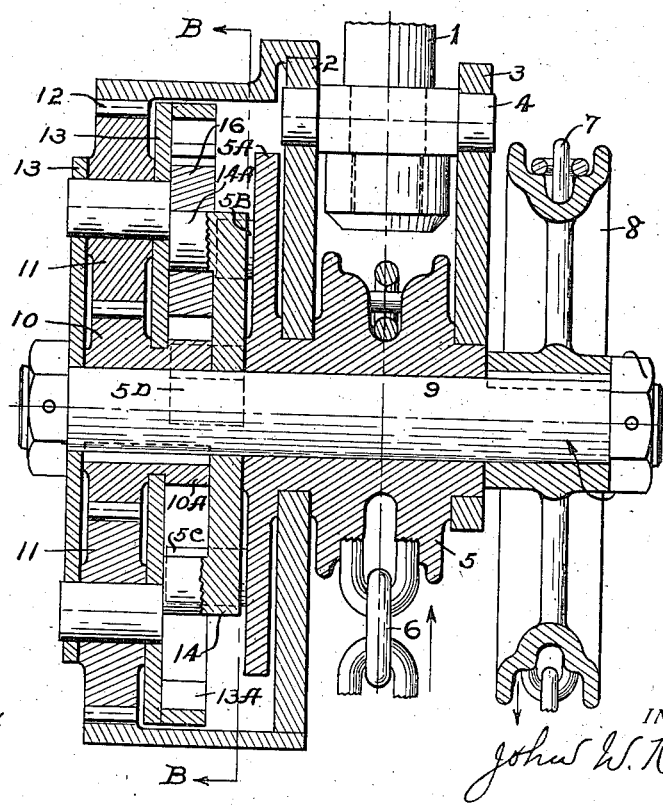

Figure 1 is a longitudinal section on line A—A of Fig. 2, and Fig. 2 is a transverse fragmentary section on line B—B of Fig. 1.

For clearness of description, a given part is designated by a numeral, as 5, and different edges or faces of that part by that numeral with letters, as 5$^A$, 5$^B$, 5$^C$, etc. Parts fastened together and having the same motion are cross-hatched alike, even though they may be separate pieces of metal. A given piece carries the same number throughout the several views.

The block is hung from an overhead support by the hook 1, which is attached to the side supports 2 and 3 by the swivel bar 4. A sprocket wheel 5 runs in the supports 2 and 3 and carries a lifting chain 6. A hand chain 7 actuates a sprocket wheel 8, which, in turn, actuates the shaft 9, which, for my purpose, is the driving shaft. It actuates a set of planetary gears as follows:—A central pinion 10 is keyed fast to the shaft 9. It meshes with two intermediate pinions 11, and they mesh with the annular gear 12, which is made fast to the side support 2, and is therefore, stationary. The pinions 11 are held in a carrier 13. As the shaft 9 and the pinion 10 turn, the pinions 11 turn on their own axes and also turn with the carrier 13 about the shaft 9. The shaft 9 and the carrier 13 always turn in the same direction, but the shaft turns much faster than the carrier. By means now to be described, the sprocket wheel 5, the driven member, may be locked either to the shaft 9 or to the carrier 13, thus giving it two different speeds from a uniform speed of the driving shaft 9.

Rigid with the pinion 10 is a ratchet 10$^A$, and rigid with the carrier 13 is the ratchet 13$^A$. The piece 14 fits loosely on the shaft 9 and may rock back and forth on it through a partial revolution. Two springs 15 attach to the piece 14, and bear, at their free ends, on two projecting lugs 5$^B$, which are rigid with the sprocket wheel 5. The piece 14 has two projecting lugs 14$^A$, which carry two pawls 16. Each pawl is slotted and engages therein a lug 5$^C$, which, also, is rigid with the sprocket 5. With a small torque on the sprocket 5, the springs 15 throw the lugs 5$^B$ away from the piece 14, to the position shown in Figs. 1 and 2. The lugs 5$^C$ simultaneously throw the hooks 16$^A$ of the pawls 16 into engagement with the ratchet 10$^A$, as shown. And as the shaft 9 is rotated in the direction indicated by the arrows, with small torque on the sprocket wheel 5, the springs 15 move the lugs 5$^B$ and the sprocket 5 with the same speed as the shaft 9, and maintain the hooks 16$^A$ in engagement with the ratchet 10$^A$.

When, however, a load is applied to the lifting chain 6, and a greater torque to the sprocket 5, opposite to the indicated direction of rotation, the lugs 5$^B$ compress the springs 15 down against the piece 14. At the same time, the lugs 5$^C$ throw the pawls 16 on the fulcrums 14$^A$ and throw them out of engagement with the ratchet 10$^A$ and into engagement with the ratchet 13$^A$. The sprocket 5 then takes the slow speed of the carrier 13. The pawl 16 is so large that it must be in engagement with one ratchet or the other at all times, and it must remain in engagement with one ratchet until it finds the position where it can shift to the other. This makes it impossible for the load to run back while the shaft 9 turns in the direction indicated. When the pawls 16 engage the ratchet 13$^A$, their forward ends engage against the lugs 5$^D$, which are rigid with the sprocket 5. Therefore, in lifting heavy loads, the ratchet 13$^A$ presses through the ends 16$^B$ against the lugs 5$^D$ of the sprocket 5, giving great strength.

It will be noted that the shifting mechanism is entirely inclosed and is protected from the operator, as well as from dirt and accidental injury; that it is actuated only by the tension on the lifting chain; that so long as there is a heavy tension on that chain, the load must necessarily run on slow speed; that so long as there is a light tension on that chain, it must necessarily run on high speed; and that the lifting chain may be run either up or down on either fast or slow speed, depending on its tension. The block may be caused to shift speed at any desired load and at that load only, by giving to the springs 15 a corresponding stiffness. With excessive friction resulting from wear or other cause, the springs 15 may fail to throw in the fast motion. The heavy pull of the load cannot fail to throw in the slow motion until the mechanism is injured beyond the possibility of use. If it fails to work, it must fail on the side of safety.

By duplicating this mechanism, a third speed may be introduced, the block adjusting itself automatically to three different speeds corresponding to three different loads; and by repeating this mechanism, the number of speeds may be multiplied indefinitely.

Having thus described my invention, I claim as new and desire to secure by Letters Patent:—

1. A transmission mechanism comprising a driving and a driven member, a plurality of means for transmitting power comprising interlocking members and adapted to transmit power through any one of said means from the driving to the driven member, shifting mechanism whereby a change of load on the driven member shifts the transmission from one transmitting means to another, and interlocking members adapted to hold one or another of the transmitting means continuously in operation so long as the load remains unchanged.

2. A transmission comprising a driving and a driven member, a plurality of transmitting means for connecting the driving to the driven member, each transmitting means having a different speed ratio from the others, a shifting mechanism operated by the driven member for shifting from one transmitting means to another controlled by varying torques on the driven member, and interlocking members adapted to steadily and continuously hold one or another of the transmitting means in operation except as a change of torque on the driven member shifts the transmission to a different transmitting means.

3. A transmission comprising a drive shaft, a driven wheel, a gear train between the drive shaft and the driven wheel, a plurality of normally operative pawl and ratchet connections between the drive shaft and the driven wheel, and means whereby a change of torque on the driven wheel holds said mechanism alternately in locked and released positions.

4. A transmission mechanism comprising a drive shaft, a driven wheel, a pinion on the said drive shaft, a set of planetary gears in mesh with the said pinion, a carrier for the said planetary gears, a ratchet rigidly connected to the said drive shaft, a second ratchet rigidly connected to the said carrier of the planetary gears, pawls, means on the said driven wheel adapted to engage the said pawls, springs adapted to throw the said pawls out of engagement with the ratchet on the carrier and into engagement with the ratchet on the drive shaft, and means whereby the torque on the driven wheel controls the operation of the springs.

In testimony whereof I have signed my name to this specification in the presence of two subscribing witnesses, this 23rd day of October, 1916.

JOHN W. KITTREDGE.

Witnesses:
EDWIN J. WRIGHT,
CHAS. A. ROSKUSKI.